Patented Dec. 22, 1942

2,306,222

UNITED STATES PATENT OFFICE 2,306,222

METHOD OF RENDERING MATERIALS WATER REPELLENT

Winton I. Patnode, Schenectady, N. Y., assignor to General Electric Company, a corporation of New York No Drawing. Application November 16, 1940, Serial No. 365,983

18 Claims. (Cl. 117—106)

This invention relates broadly to the treatment of materials. More particularly it is concerned with the production of water-repellent materials by treating solid bodies normally water-non-repellent with a composition comprising an organo-silicon halide (e. g., methyl silicon chlorides) in vapor form thereby to render the said body water-repellent.

It has been known heretofore that silk, cotton, linen and other textile materials could be made resistant to water by coating the material with a water-repellent composition, for example, rubber, metallic soaps, plasticized polyvinyl chloride, certain synthetic resins, etc. Generally, the process involved treating the material to be waterproofed with a solvent solution of the water-repellent composition, for instance by passing it through a bath of the composition, and thereafter heating the coated and impregnated article to remove the solvent. The process involved considerable fire hazard. Furthermore, articles waterproofed in this manner have not been entirely satisfactory for many applications, for example in the production of wearing apparel such as raincoats, raincapes, etc., due to the fact that the treated material, although it was resistant to penetration by water, was substantially nonporous and therefore did not permit the passage of moisture given off by the body of the wearer. As a result, waterproofed wearing apparel of this kind frequently was a source of discomfort to the wearer.

I have discovered that the above difficulties can be obviated and a rapid and economical method of treating materials to waterproof them is provided by contacting solid bodies which are normally wetted by water (that is, water-non-repellent) with a composition comprising an organo-silicon halide (or mixture of organo-silicon halides) in vapor form. In a preferred embodiment of the invention I bring the body to be treated, for example a flexible sheet material, into contact with the vapors of a composition comprising an organo-silicon halide, specifically methyl silicon chloride, and then bring the thus treated body into contact with the vapors of an alkaline reagent, for example ammonia. The alkaline reagent neutralizes any acidity that may be present after treating the body with the vapors of the organo-silicon halide.

In order that those skilled in the art better may understand how the present invention may be carried into effect, the following illustrative examples thereof are given:

Example 1

A clean glass surface was exposed to the vapor of a mixture of methyl silicon chlorides consisting mainly of $(CH_3)SiCl_3$ and $(CH_3)_2SiCl_2$. The glass acquired an invisible, tightly adherent surface film upon which water does not spread, that is, the thus treated glass is not wetted by water. This water-repelling surface apparently is integral with the glass, as evidenced by the fact that the surface can be scrubbed with acetone, alcohol, soap and water, etc., without losing its ability to shed water.

A glass tube treated on the inside in a similar manner is not wetted by water and hence shows no meniscus at the surface. Graduated glass tubes such as measuring cylinders, liquid level tubes, draft gauges, hydrometers, etc., therefore advantageously may be treated with vapors of organo-silicon halides to improve their surface characteristics. In a similar manner other glassy, vitreous and ceramic bodies may be treated to render them water-repellent. For example, fibers or filaments of glass may be treated in this way thereby to obtain a more valuable electrically insulating material. Such treatment also may be applied to glass insulators and glazed porcelain insulators to improve their flashover characteristics.

Metals likewise may be treated with vapors of an organo-silicon halide to render them nonwettable by water. For example, oxidized aluminum foil upon treatment with vapors of a mixture of methyl silicon chlorides becomes resistant to wetting by water. Aluminum ice-cube trays and dividers similarly may be treated.

Example 2

This example illustrates the process which is preferred in certain cases, for instance in the treatment of organic materials, e. g., wood, paper, cloth made of cotton, linen, silk, wool, synthetic fibers such as linear condensation polyamides, and similar materials which may be detrimentally affected by halogen acids.

A piece of cotton cloth, predried to remove surface moisture, was exposed first to the vapors of a mixture of methyl silicon chlorides and immediately thereafter to the vapors of ammonia to neutralize any free acid that may have been present. The treated cloth was so water-repellent that it could be made into a bag that would hold water. Furthermore, it could be scrubbed with alcohol, acetone and aqueous soap solution without losing its water-repelling characteristics.

This shows the suitability of the treated textile materials of this invention for the production of shower curtains, awnings, umbrella covers, wearing apparel such as raincoats, raincapes, sports jackets, etc. The block printing of fabrics may be aided by the described treatment to produce sharp outlines. Wires insulated with cotton, asbestos, cellulose derivatives, including regenerated cellulose, and other water-non-repellent insulating materials advantageously may be treated with vapors of organo-silicon halides, for instance organic-silicon chlorides, bromides, etc., to improve their surface characteristics.

Paper when treated as described above with particular reference to the treatment of cotton cloth acquires the property of shedding water and, even after soaking in water, has considerable mechanical strength. This superficial treatment apparently does not prevent the fibers themselves from absorbing water, but does prevent disintegration of the paper. A piece of very thin tissue paper treated in this manner can be held under running water and yet, despite this rigid test, the water does not soak into the paper nor does the paper disintegrate. This water-resisting property would be useful in fancy wrapping tissue papers used, for example, in wrapping gifts, etc. A piece of filter paper after treatment with vapors of methyl silicon chlorides can be written on with pen and ink to leave a sharp, fine line. Blotting paper so treated is useless for its intended purpose. Printing papers and papers for recording instruments advantageously may be treated with organo-silicon halide vapors. This vapor treatment also may be applied to paper bags and cardboard shipping containers to make them showerproof. Asbestos paper, mica and non-waterproofed Cellophane (regenerated cellulose) also respond to this treatment.

I am unable definitely to state the reason why solid bodies which originally are water-non-repellent are rendered water-repellent or resistant to wetting by water when treated with the vapors of an organo-silicon halide, for example methyl silicon chloride. One possible explanation is that organo-silicon halide vapors react with an adsorbed film of water to form the corresponding silicol, which is strongly adsorbed and water-repellent, or a water-repellent silicone may be formed. Since it is known that the halogen atoms in compounds of this type will react with active hydrogen such as that in a hydroxyl group, it is also possible that in certain cases, for instance with cellulose and possibly also in the case of asbestos and a hydrated aluminum oxide surface, there has been produced a chemical compound of the organo-silicon halide with the material that has been treated. Whatever the explanation may be, the fact remains that the treated surface acquires a hydrophobic coating. The nature of the coating cannot be ascertained by chemical analysis, since the coating not only is invisible to the naked eye but cannot be seen even under a high-powered microscope and, in general, is so thin as to be practically impossible to weigh.

While I have described my invention with particular reference to the treatment of glass, paper, textile materials, etc., with vapors of an alkyl silicon chloride, specifically methyl silicon chloride, it will be obvious to those skilled in the art that vapors of other organo-silicon halides (or mixtures thereof) may be used to treat water-non-repellent bodies in accordance with the present invention. Illustrative examples of such organo-silicon halides are the alkyl silicon halides (e. g., ethyl, propyl, butyl, etc., silicon halides), the aryl silicon halides (e. g., phenyl silicon halides, etc.), aralkyl silicon holides (e. g., phenylmethyl silicon halides, etc.), alkaryl silicon halides (e. g., tolyl silicon holides, etc.) and compounds such, for example, as $(CH_3)_2HSiCl$ and similar alkyl, aryl, etc., halosilanes, specifically chlorosilanes. It is not essential that the organo-silicon halide normally be a gas; the only requirement is that it be convertible into a gas. For optimum results the chosen organo-silicon halide should have reasonable stability in gaseous state. I prefer to use methyl silicon chlorides in carrying the invention into effect.

Any reagent capable of neutralizing acids may be employed. I prefer to use a reagent which is normally a gas, for example ammonia, methyl amine, etc., or which is convertible into a gas, for instance ethyl amine, diethyl amine, propyl amine, dipropyl amine, etc.

The process herein described may be carried out continuously, intermittently or by batch technique. The continuous method is preferred, since maximum capacity at lowest unit cost thereby is obtained. Furthermore, since the treating agent is employed in gaseous state, the process lends itself best to a continuous treatment of the sheet or other materials to be contacted with the organo-silicon halide vapors.

From the foregoing description it will be seen that the present invention provides articles of manufacture comprising a solid body normally water-non-repellent which has been treated with a composition comprising an organo-silicon halide in vapor form thereby to render it water-repellent. Flexible, porous sheet materials such as cotton cloth, etc., which are treated as herein described, acquire the power to shed water while at the same time retaining sufficient porosity that gases at normal pressures can pass therethrough. The present invention also provides a rapid and economical method of treating materials to render them resistant to wetting by water.

What I claim as new and desire to secure by Letters Patent of the United States is:

1. The process of treating a solid body normally water-non-repellent which comprises contacting said body with a composition comprising an organo-silicon halide in vapor form thereby to render the said body water-repellent.

2. A process as in claim 1 wherein the organo-silicon halide is an alkyl silicon chloride in vapor form.

3. The method of treating solid bodies to render them resistant to aqueous liquids which comprises bringing such body to be treated into contact with the vapors of a composition comprising an organo-silicon halide and bringing the thus treated body into contact with the vapors of an alkaline reagent.

4. A method as in claim 3 wherein the organo-silicon halide is a methyl silicon chloride.

5. A method as in claim 3 wherein the alkaline reagent is ammonia.

6. The process which comprises the steps of first contacting a solid body that is to be rendered water-repellent with the vapors of a mixture of methyl silicon chlorides and thereafter contacting the thus treated body with the vapors of an alkaline reagent.

7. The process which comprises the steps of first contacting a solid body that is to be rendered water-repellent with the vapors of a mixture of methyl silicon chlorides consisting mainly of $(CH_3)SiCl_3$ and $(CH_3)_2SiCl_2$ and thereafter contacting the thus treated body with ammonia in vapor form.

8. The process of waterproofing fabric materials which comprises treating the fabric material with vapors comprising an organo-silicon halide.

9. The process of treating paper which comprises contacting the paper with vapors comprising an alkyl silicon chloride.

10. The process of making glass non-wettable by water which comprises treating the glass with the vapors of a mixture of methyl silicon chlorides.

11. An article of manufacture comprising a solid body normally water-non-repellent which has been treated with a composition comprising an organo-silicon halide in vapor form thereby to render it water-repellent.

12. An article of manufacture comprising a solid body normally water-non-repellent which has been treated with the vapors of a composition comprising methyl silicon chloride thereby to render it water-repellent.

13. Sheet materials which have been treated with vapors comprising an organo-silicon halide.

14. Flexible sheet materials which have been treated with vapors comprising an alkyl silicon halide.

15. Glass which has been treated with vapors comprising an alkyl silicon halide.

16. Textile materials which have been treated with vapors of methyl silicon chlorides.

17. Paper which has been treated with vapors of methyl silicon chlorides.

18. Cotton cloth which has been treated with vapors of methyl silicon chlorides.

WINTON I. PATNODE.